(12) United States Patent
Tonai et al.

(10) Patent No.: US 6,234,686 B1
(45) Date of Patent: May 22, 2001

(54) OPTICAL DATA LINK

(75) Inventors: Ichiro Tonai; Takeshi Irie; Toshio Mizue, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/204,274

(22) Filed: Dec. 3, 1998

(30) Foreign Application Priority Data

Dec. 3, 1997 (JP) .................................................. 9-333130
Dec. 25, 1997 (JP) .................................................. 9-357374

(51) Int. Cl.$^7$ .................................................. G02B 6/43
(52) U.S. Cl. .................................................. 385/88; 385/94
(58) Field of Search .................................................. 385/88, 89, 90, 385/91, 92, 93, 94

(56) References Cited

U.S. PATENT DOCUMENTS

| | | | |
|---|---|---|---|
| 4,410,469 | 10/1983 | Katagiri et al. | 264/1.5 |
| 4,911,519 | 3/1990 | Burton et al. | 350/96.2 |
| 5,113,466 | 5/1992 | Acarlar et al. | 385/88 |
| 5,127,071 | 6/1992 | Go | 385/73 |
| 5,353,364 | * 10/1994 | Kurashima | 385/88 |
| 5,475,783 | 12/1995 | Kurashima | 385/92 |
| 5,717,803 | * 2/1998 | Yoneda et al. | 385/89 |
| 5,719,979 | * 2/1998 | Furuyama | 385/89 |
| 5,742,480 | 4/1998 | Sawada | 361/749 |
| 5,963,693 | * 10/1999 | Mizue et al. | 385/88 |

FOREIGN PATENT DOCUMENTS

| | | |
|---|---|---|
| 053 483 | 6/1982 | (EP) . |
| 510860 | 10/1992 | (EP) . |
| 582 992 A1 | 2/1994 | (EP) . |
| 582992 | 2/1994 | (EP) . |
| 710861 | 5/1996 | (EP) . |
| 826 997 A2 | 3/1998 | (EP) . |

* cited by examiner

*Primary Examiner*—Frank G. Font
*Assistant Examiner*—Roy M. Punnoose
(74) *Attorney, Agent, or Firm*—Pillsbury Madison & Sutro LLP

(57) ABSTRACT

The present invention relates to an optical data link having a structure which is quite easy to manufacture at a low cost and realizes high optical accuracy, high mechanical accuracy, and high reliability. This optical data link comprises a light-receiving module for outputting an optical signal from an optical fiber transmission line as an electric signal, and a light-emitting module for transmitting the optical signal to the optical fiber transmission line. Each of these optical modules comprises a body portion including an electronic device; a head portion including a light-receiving device or light-emitting device; and a neck portion, processed into a predetermined form, for communicating the body portion and head portion to each other. The optical modules are mounted on an insulating substrate, and are at least partly accommodated in a housing, while being separated from each other by a predetermined distance.

16 Claims, 12 Drawing Sheets

OPTICAL DATA LINK

BACKGROUND OF THE INVENTION

1. Field of the Invention

The present invention relates to a light-receiving module for converting an optical signal propagating through an optical fiber into an electric signal and outputting thus obtained electric signal, a light-emitting module for converting the electric signal to an optical signal and transmitting thus obtained optical signal to the optical fiber, and an optical data link comprising these optical modules.

2. Related Background Art

As conventional data links, those disclosed in Japanese Patent Application Laid-Open Nos. 57-91571, 57-91572, and 2-61921 have been known, for example.

In Japanese Patent Application Laid-Open Nos. 57-91571 and 57-91572, an optical device for converting an optical signal to an electric signal and an electronic circuit for processing the electric signal outputted from this optical device are transfer-molded with a transparent resin so as to form an intermediate component, which is accommodated in a housing provided with a mechanism for joining it with an optical fiber, thus constituting an optical module. Further, a predetermined assembling jig is used for placing this intermediate component at a predetermined position, and a resin opaque to the optical signal is injection-molded, thereby forming a housing which can block off external light.

The optical data link disclosed in Japanese Patent Application Laid-Open No. 2-61921 has a configuration in which an optical device is mounted to a base part of an optical connector made of a metal. This optical connector is provided with a joint mechanism for connecting a ferrule accommodating a tip portion of an optical fiber. When mounting the optical device to the base part, an optical signal is actually introduced in the optical fiber and, while the electric signal outputted from the optical device in response thereto is being observed, the optical axes of optical fiber and optical device are adjusted with respect to each other, such that the optical device is mounted at its optimal position where a predetermined level of electric signal is attained. Further, the metal connector mounted with the optical device and a hybrid IC board equipped with an electronic circuit for processing the electric signal are integrally molded with a resin, thereby forming an optical data link.

SUMMARY OF THE INVENTION

Having studied the conventional optical data links, the inventors have found the following problems. Namely, in the optical data links disclosed in Japanese Patent Application Laid-Open Nos. 57-91571 and 57-91572, when adjusting the optical axes of an optical fiber and a transfer-molded optical device, their centering accuracy has not been high since it is influenced by various factors such as the accuracy in installation of the jig used when molding the housing, the accuracy in installation of the intermediate component, and the form of the intermediate component.

Also, the optical axes of the optical fiber and optical device are only indirectly matched by way of the housing. Therefore, even when the optical axes of the optical fiber and optical device are matched in a centering operation during a manufacturing step, they may shift from each other if a mechanical stress is applied to the housing during a later manufacturing step or the like.

Further, for forming a transmitter-receiver optical data link in which a light-emitting module incorporating an electricity-to-light conversion device (optical device) therein and a light-receiving module incorporating a light-to-electricity conversion device (optical device) therein are integrally assembled therein, the distance between these optical modules must be adjusted with the axis-to-axis distance of the jig for adjusting the optical axes of the optical fiber and these optical devices. Hence, the microscopic adjustment of optical axes of the optical fiber and these optical devices and the macroscopic adjustment of the positions of the light-emitting and light-receiving modules must be effected concurrently in the same step with the same jig. It has been very hard to effect both adjustments at the same time.

Further, due to restrictions on the dimension of lead frames, it has been very difficult to install a large-scale electronic circuit for performing complicated signal processing in response to the demand for higher-grade optical communications. Namely, when the lead frame is made larger, the volume of the intermediate component also increases, thereby making the optical axis adjustment harder, and the optical axes are likely to shift after the completion.

The optical data link disclosed in Japanese Patent Application Laid-Open No. 2-61921 is advantageous in that the optical axis adjustment and the axis-to-axis adjustment can be effected separately from each other as the metal optical connector and the hybrid IC are integrated together as being sealed with a resin. On the other hand, it must use an expensive connector made of a metal. Further, a separate condenser lens must be mounted in the metal connector, and the electronic circuit has to be subjected to a two-step manufacturing process in which it is once prepared as a hybrid IC and then is mounted on a lead frame, thereby increasing the number of parts and complicating the manufacturing process.

In view of such problems of the prior art, it is an object of the present invention to provide an optical data link that is quite easy to manufacture at a low cost and achieves high optical/mechanical accuracy and high reliability.

The optical data link according to the present invention connects an optical fiber transmission line and an electric signal transmission line to each other. In order to attain the above-mentioned object, the optical data link according to the present invention comprises a housing, light-receiving and light-emitting modules at least partly accommodated in the housing, and an insulating substrate having a main surface on which the light-receiving and light-emitting modules are mounted in a state separated from each other by a predetermined distance.

Each of the light-receiving and light-emitting modules has a head portion being provided such that an optical component including one of light-receiving and light-emitting devices and a first support portion on which the optical component is mounted are integrally resin-molded; a body portion being provided such that an electronic device and a second support portion on which the electronic device is mounted are integrally resin-molded; and a neck portion coupling the first support portion to the second support portion and, in a state where the optical component and the electronic device are electronically connected to each other, supporting the head portion at a predetermined position with respect to the body portion.

As a consequence of the configuration mentioned above, the optical data link of the present invention does not need an expensive connector made of a metal. Once adjusted, optical axes would not shift during a later manufacturing step or the like. For attaining higher functions, it would neither increase the number of electronic devices nor influence the optical axis adjustment. Further, the positions of the light-emitting and light-receiving modules are accurately controlled by the substrate.

The optical data link can also be modified to overcome the following structural problem. Namely, since a large current is switched for driving the light-emitting element (optical device) of the light-emitting module, the electromagnetically induced noise generated upon this switching influences the light-receiving module handling minute signals, thereby lowering the minimum input sensitivity.

In typical optical data links, the input amplitude is very low, i.e., on the order of several mV in terms of voltage. By contrast, a switching current exceeds several ten mA. Hence, when the light-emitting and light-receiving modules are disposed close to each other in order to reduce the size of optical data link, the influence of electromagnetically induced noise increases.

The above-mentioned problem can be overcome by the configuration in which, in a state where the light-receiving and light-emitting modules, which have the above-mentioned head portion, body portion, and neck portion respectively, are arranged on the main surface of the insulating substrate as a predetermined reference surface, the neck portion of the light-receiving module is bent so as to project along a first direction orthogonal to the reference surface, and the neck portion of the light-emitting module is bent so as to project along a second direction opposite to the first direction.

Since these projections are thus distanced from each other, even when the light-emitting and light-receiving modules are disposed close to each other in the housing, the influence of the electromagnetically induced noise between these optical modules is suppressed.

Also, in the present invention, as the light-emitting module and light-receiving module independent of each other are mounted in the housing, the power lines and ground lines of their respective lead frames are electrically separated from each other. As a consequence, influences of noise such as surge and ripple can be eliminated between the optical modules.

In the optical data link according to the present invention, each of the light-receiving and light-emitting devices may include a lead frame comprising a first part having a mounting surface for the electronic device; a second part having a surface which is continuous from the mounting surface and on which the optical device is mounted; and a third part connecting the first part and the second part. In this case, the lead frame preferably comprises a DIP type outer lead pin for external connection or a SIP type outer lead pin for external connection.

In the case where the lead frames having the above structure are installed in the respective optical modules, the third parts are bent in a same manner such that the optical devices mounted on the second parts are oriented in the same direction and, on the other hand, the outer lead pins of one lead frame and the outer lead pins of the other lead frame are bent in directions opposite to each other. Thereby, when the respective optical modules including these lead frames are arranged in the housing, the projections of the respective third parts become apart from each other.

Further, in this arrangement, since parts of the lead frames being grounded intervenes between the electronic devices of the respective optical modules, the arrangement brings a shield effect between the electronic devices.

Preferably, the optical data link according to the present invention comprises a sleeve for positioning a tip portion of an optical fiber at a predetermined position.

The optical fiber includes a multi-mode optical fiber. The head portion allows to include a sub-mount member disposed between the optical component (light-receiving or light-emitting device). This optical component is mounted to the first support portion with the sub-mount member interposed therebetween.

The light-emitting device preferably includes at least one of a surface emission type light-emitting diode and a surface emission type semiconductor laser. On the other hand, the light-receiving device includes a front illumination type InGaAs photodiode.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3A is a perspective view showing the appearance of the completed light-receiving module, whereas

FIG. 6A is a perspective view showing the appearance of the completed light-emitting module, whereas

FIG. 7A is a view showing an assembling process for optically coupling an optical fiber transmission line to the light-receiving module or light-emitting module via a sleeve, whereas

DESCRIPTION OF THE PREFERRED EMBODIMENTS

First Embodiment

The first embodiment of the optical data link according to the present invention will be explained with reference to FIGS. 1, 2, 3A, 3B, 4, 5, 6A to 7B, 8, and 9. First, the configuration of a light-receiving module for receiving an optical signal and converting this optical signal to an electric signal will be explained together with its manufacturing process.

Figure 1:
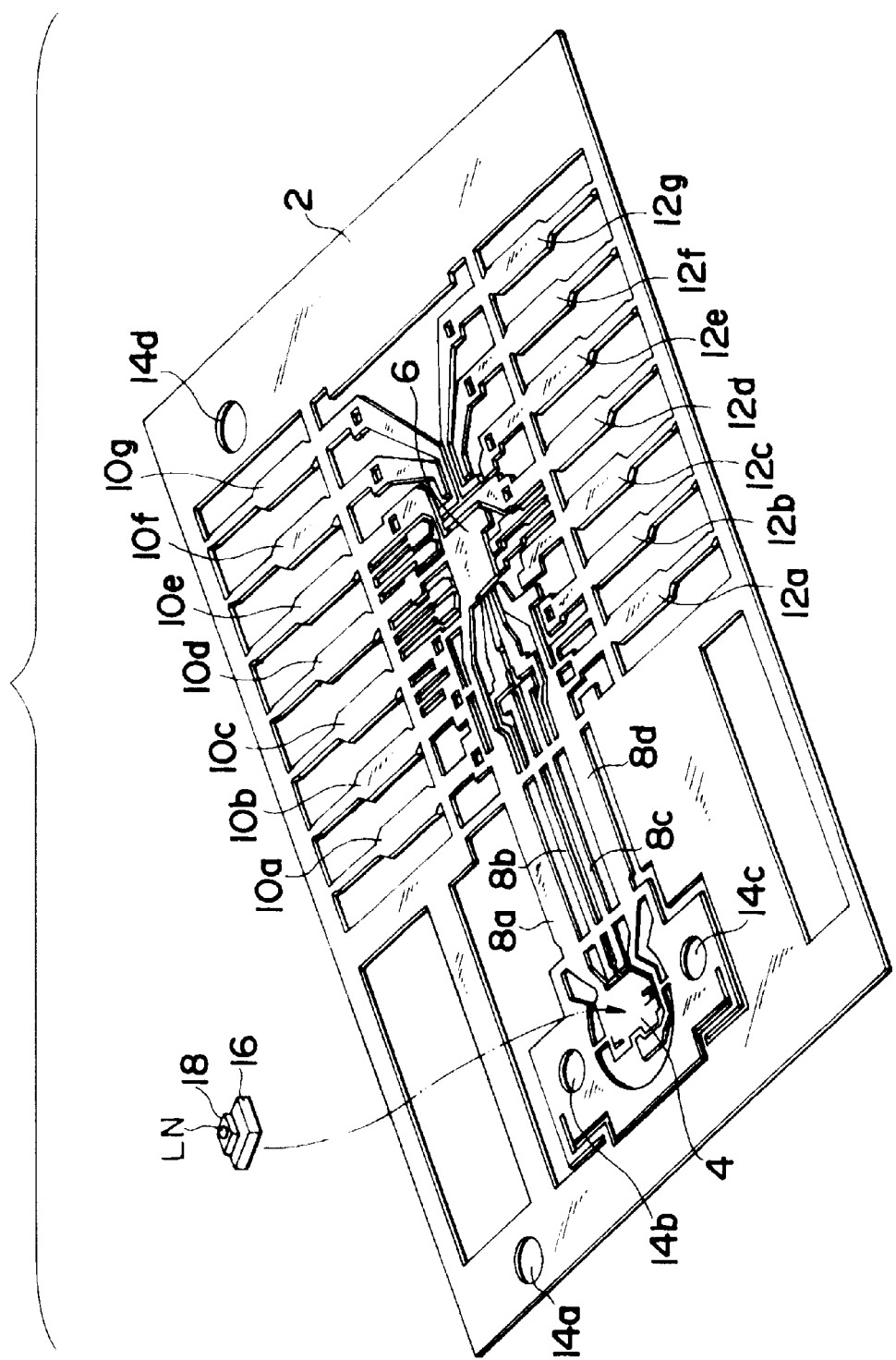
FIG. 1 is a perspective view showing the form of a lead frame for the light-receiving module in a first embodiment of the optical data link according to the present invention.

FIG. 1 shows the form of a lead frame for manufacturing the light-receiving module. For this lead frame 2, a thin copper sheet having a thickness of about 0.2 mm is etched such as to form an optical device mounting portion 4 (first support portion) for mounting a light-receiving device (light-to-electricity conversion device) which is an optical device, an electronic device mounting portion 6 (second support portion) for mounting an electronic circuit (electronic device), four inner lead pins 8a to 8d (neck portion) for electrically and mechanically connecting the optical device mounting portion 4 and the electronic device mounting portion 6 to each other, and outer lead pins 10a to 10g, 12a to 12g disposed, seven by seven, on both sides of the electronic device mounting portion 6. The surfaces of the optical device mounting portion 4 and electronic device mounting portion 6 are plated with silver. At predetermined positions, the lead frame 2 is provided with a plurality of alignment holes 14a to 14d for positioning a mold for resin molding which will be explained later.

When this lead frame 2 is conveyed to a predetermined position of the manufacturing line, a sub-mount member 16 made of an insulating material such as aluminum nitride (AlN) is fixedly attached onto the optical device mounting portion 4. Subsequently, a light-receiving device 18, as a bare chip, is fixedly attached onto the sub-mount member 16. As the light-receiving device 18, an InGaAs photodiode sensitive to a wavelength of 1.3-$\mu$m band is used. Further, as an active or passive element, which is an electronic device, is fixedly attached onto the electronic device mounting portion 6, an electronic circuit for amplifying the electric signal outputted from the light-receiving device 18, for example, is mounted thereon. The electronic circuit and the outer lead pins 10a to 10g, 12a to 12g are electrically connected to each other with bonding wires.

As the sub-mount member 16, an insulating material made of aluminum nitride (AlN) or the like whose front and rear faces are formed with metal wiring patterns, a parallel capacitor or the like is employed. As being mounted on the metal wiring pattern on the front face side or one electrode of the DIECAP, the light-to-electricity conversion device 18 is capacity-coupled to the optical device-mounting portion 4.

The inner lead pins 8a, 8d are used as power and ground lines, whereas the inner lead pins 8b, 8c are used as signal lines, which are thereby shielded.

The electronic device includes preamplifier IC and main amplifier for amplifying the photoelectrically converted signal outputted from the light-to-electricity conversion device 18, a coupling capacitor for interstage coupling, a power bypass capacitor, a resistor, and the like.

The preamplifier may be mounted on the optical device-mounting portion 4 together with the light-to-electricity conversion device 18. In this case, the electronic device components other than the preamplifier are mounted to the electronic device-mounting portion 6. When the light-to-electricity conversion device 18 and the preamplifier are thus mounted on the optical device mounting portion 4, the transmission path for the minute signals outputted from the light-to-electricity conversion device 18 to the preamplifier can be shortened, thus allowing the influence of external electromagnetically induced noise to decrease.

The lead frame 2 mounted with the light-receiving device (light-to-electricity conversion device) 18 and the electronic circuit as mentioned above is then transferred to a mold die for resin molding having a predetermined form. Thus transferred lead frame 2 is positioned with respect to the mold with the aid of the alignment holes 14a to 14d. Then, the optical device-mounting portion 4 and the electronic device-mounting portion 6, while being separated from each other, are sealed with a resin transparent to the optical signal. Consequently molded are a head portion 20 in which the optical device mounting portion 4 and the sub-mount member 16 and light-receiving device 18 mounted thereto are integrally sealed, and a body portion 22 in which the electronic device mounting portion 6 and the electronic circuit mounted thereto are integrally sealed (see FIG. 2). Here, the head portion 20 and the body portion 22 may also be molded with a transparent resin and an opaque resin, respectively.

The head portion 20 has a base part 24 having substantially a rectangular parallelepiped form integrally sealing the sub-mount member 16, light-receiving device 18, and optical device mounting portion 4; a pedestal part 26 having a circular truncated cone form integrally molded on the base part 24; and an aspherical lens 28 integrally molded at the top portion of the pedestal part 26. The aspherical lens 28, the optical main surface (light-receiving surface) of the light-receiving device 18 in terms of optical axis.

The pedestal part 26 is formed as a circular truncated cone having a predetermined taper side face and a predetermined height, such as to taper down toward the tip portion concentrically with the optical axis of the aspherical lens 28, light-receiving device 18.

Figure 2:
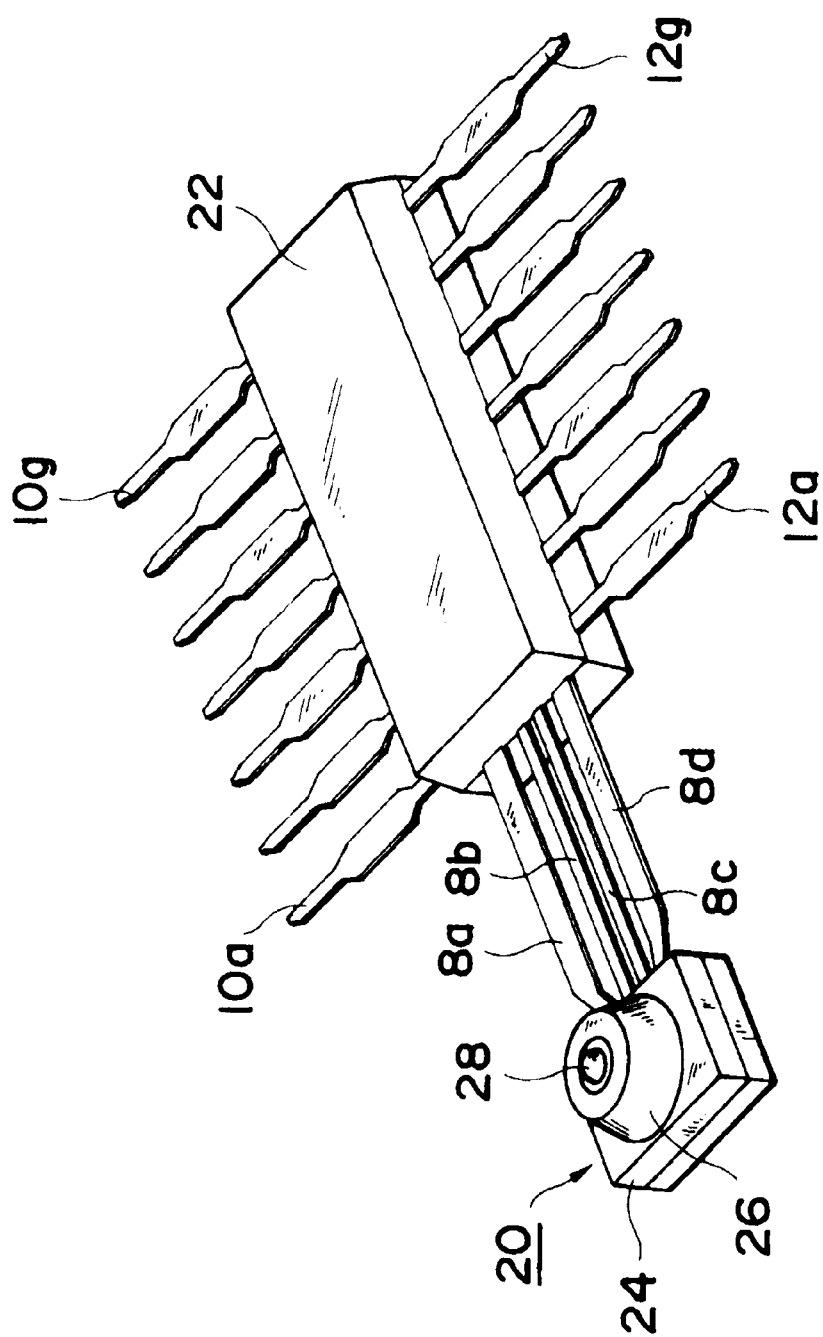
FIG. 2 is a perspective view showing the appearance of the intermediate component of the light-receiving module.

After the head portion 20 and the body portion 22 are molded, unnecessary portions of the lead frame 2 are removed, whereby an intermediate component such as that shown in FIG. 2 is obtained. Further, the inner lead pins 8a to 8d (neck portion) and the outer lead pins 10a to 10g, 12a to 12g are bent, thus yielding a DIP (dual inline package) type light-receiving module 30 as shown in FIGS. 3A and 3B.

Figure 3A:
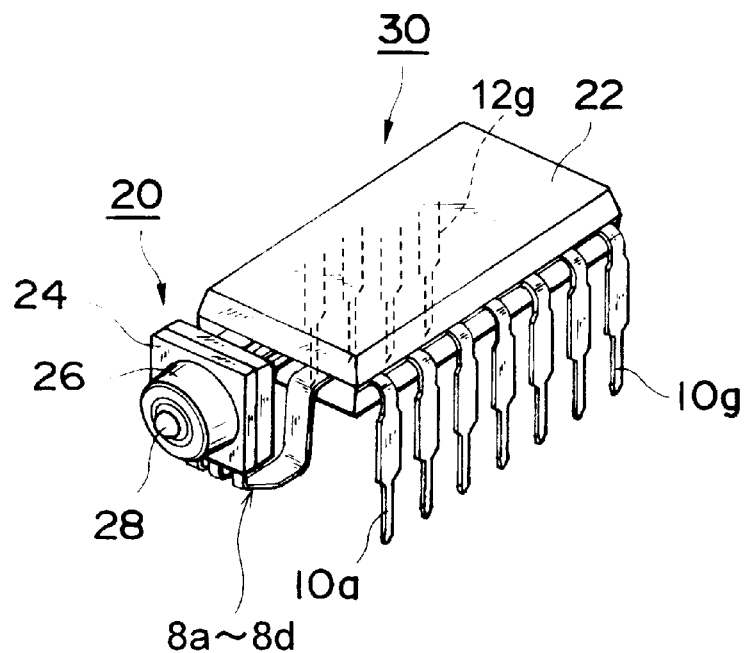
Figure 3B:
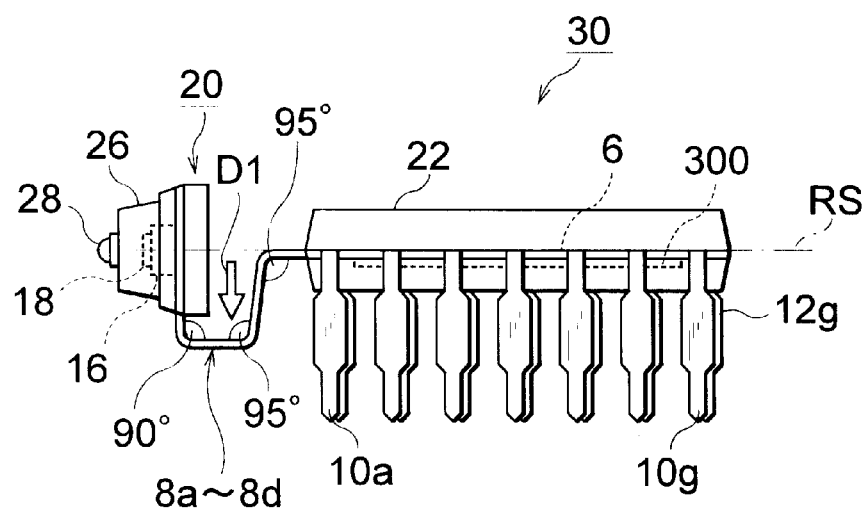
FIG. 3B is a side view of the light-receiving module shown in FIG. 3A.

FIG. 3A is a perspective view of thus completed light-receiving module 30 as observed from obliquely in front of the head portion 20, whereas FIG. 3B is a side view of the light-receiving module 30.

Here, as shown in FIG. 3B, the respective parts of the inner lead pins 8a to 8d in close proximity to the body portion 22 are bent downward (inward) at an angle of about 95°. Substantially the center parts thereof are bent to the opposite side (outward) at an angle of about 95°. Their parts in close proximity to the head portion 20 are bent upward at an angle of about 90°. Consequently, each of the inner lead pins 8a to 8d has a form projecting in the direction indicated by the arrow D1 perpendicular to the reference surfacers. On the other hand, the outer lead pins 10a to 10g, 12a to 12g are bent such as to extend in a direction (coinciding with the direction indicated by the arrow D1) orthogonal to the mounting surface of the electronic device mounting portion 6 on the side mounted with an electronic device 300.

When the light-receiving module 30 having thus bent inner lead pins 8a to 8d and outer lead pins 10a to 10g, 12a to 12g is attached to an alignment substrate 80 (insulating substrate), which will be explained later, via the outer lead pins 10a to 10g, 12a to 12g, the electronic device mounted to the electronic device mounting portion 26 would be positioned on the lower side of the lead frame. Also, the intermediate portions of the inner lead pins 8a to 8d become substantially in parallel to the reference surface RS.

The light-receiving module 30 is actuated when electric power is supplied to a predetermined lead pin among the outer lead pins 10a to 10g, 12a to 12g. The electric signals outputted from the light-receiving device 18 in the head portion 20 are fed into the electronic circuit in the body portion 22 via the inner lead pins 8a to 8d and, after being processed therein, are outputted from other outer lead pins.

Since the light-receiving module 30 has the head portion 20 integrated with the aspherical lens 28, the number of parts can be reduced therein. Also, it becomes unnecessary to adjust the optical axis and axis-to-axis distance between the light-receiving device 18 and aspherical lens 28. Further since such a structure as to couple the condenser lens and the light-receiving device with a metal connector or the like is unnecessary, the light-receiving module 30 can realize a lower cost.

Further, the head portion 20 incorporating the light-receiving device 18 therein and the body portion 22 incorporating the electronic circuit therein are molded as being separated and independent from each other. In addition, since they are electrically and mechanically connected together via the inner lead pins 8a to 8d, when applied to a communications device such as optical transceiver, the attachment position of the head portion 20 can be adjusted independently without being influenced by the attachment position of the body portion 22. As a consequence, the optical axis adjustment or axis-to-axis adjustment with respect to an optical fiber in the communications device can easily be effected.

Further, in the first embodiment, since the optical device mounting portion 4 and the electronic device mounting portion 6 are separated from each other, the degree of freedom in designing electronic circuits is enhanced, whereby a complicated, large-scale electronic circuit adapted to correspond to the demand for higher-grade optical communications can be mounted thereto. Also, even when the body portion 22 is made larger as the scale of the electronic circuit enhances, the head portion 20 would not be influenced thereby, whereby the optical axis adjustment and axis-to-axis adjustment when applied to the communications device can easily be effected.

Further, since this light-receiving module 30 has no movable part, it has an excellent structure in that mechanical strength is high, its optical accuracy is always held in an optimal state, and so forth.

With reference to FIGS. 4, 5, 6A, and 6B, the configuration of a light-emitting module for converting an electric signal to an optical signal and transmitting this optical signal to an optical fiber will now be explained together with its manufacturing process.

Figure 4:
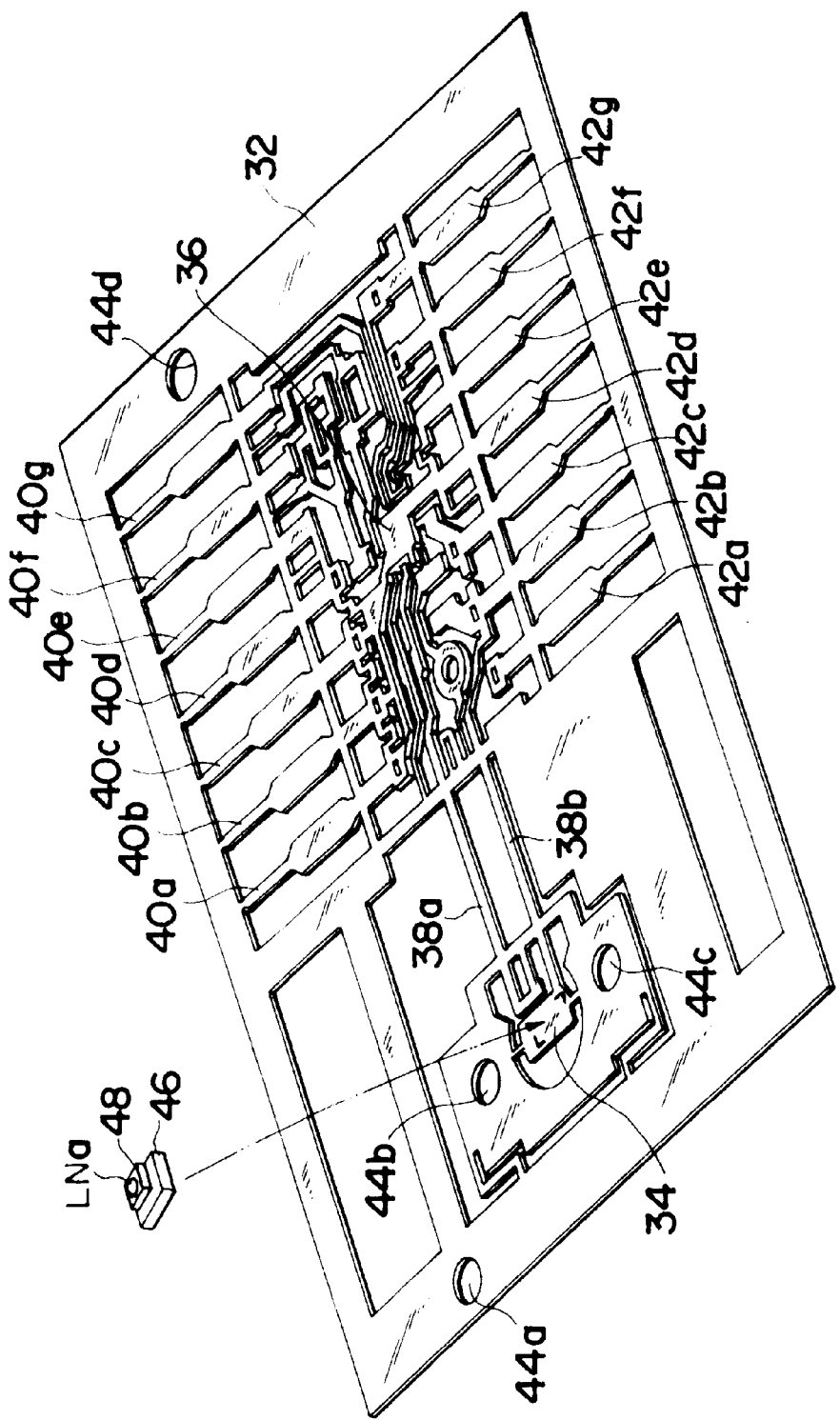
FIG. 4 is a perspective view showing the form of a lead frame for the light-emitting module in the first embodiment of the optical data link according to the present invention.

FIG. 4 shows the shape of a lead frame for manufacturing the light-emitting module. For this lead frame 32, a thin copper sheet having a thickness of about 0.2 mm is etched such as to form an optical device mounting portion 34 for mounting a light-emitting device (electricity-to-light conversion device) which is an optical device, an electronic device mounting portion 36 for mounting an electronic circuit (electronic device), two inner lead pins 38a, 38b (neck portion) for electrically and mechanically connecting the optical device mounting portion 34 and the electronic device mounting portion 36 to each other, and outer lead pins 40a to 40g, 42a to 42g disposed, seven by seven, on both sides of the electronic device mounting portion 36. The surfaces of the optical device mounting portion 34 and electronic device mounting portion 36 are plated with silver. At predetermined positions, the lead frame 32 is provided with a plurality of alignment holes 34a to 34d for positioning a mold for resin molding which will be explained later.

Subsequently, an electricity-to-light conversion device 48, as a bare chip, is fixedly attached onto the sub-mount member 46. As the light-receiving device 48, a surface emission type InGaAsP light-emitting diode or surface emission type InGaAs laser diode for emitting an optical signal in 1.3-$\mu$m band, is used, for example. Further, as an active or passive element, which is an electronic device, is fixedly attached onto the electronic device-mounting portion 36, an electronic circuit is mounted thereon. The electronic circuit and the outer lead pins 40a to 40g, 42a to 42g are electrically connected to each other with bonding wires.

The lead frame 32 mounted with the light-emitting device (electricity-to-light conversion device) 48 and the electronic circuit as mentioned above is then transferred to a mold die for resin molding. Thus transferred lead frame 32 is positioned with respect to the mold with the aid of the alignment holes 44a to 44d. Then, the optical device-mounting portion 34 and the electronic device-mounting portion 36, while being separated from each other, are sealed with a resin transparent to the optical signal. Consequently molded are a head portion 50 in which the optical device mounting portion 34 and the sub-mount member 46 and light-receiving device 48 mounted thereto are integrally sealed, and a body portion 52 in which the electronic device mounting portion 36 and the electronic circuit mounted thereto are integrally sealed (see FIG. 5). Here, the head portion 50 and the body portion 52 may also be molded with a transparent resin and an opaque resin, respectively.

The head portion 50 has a base part 54 having substantially a rectangular parallelepiped form sealing the light-emitting device 48 and optical device mounting portion 34; a pedestal part 56 having a circular truncated cone form integrally molded on the base part 54; and an aspherical lens 58 integrally molded at the top portion of the pedestal part 56. The optical axes of the aspherical lens 58 and light-emitting device 48 align with each other. The pedestal part 56 is formed as a circular truncated cone having a predetermined taper side face and a predetermined height, such as to taper down toward the tip portion concentrically with the optical axis of the aspherical lens 58, light-emitting device 48, and condenser lens $LN_a$. Further, the upper end part of the body portion is provided with depressions 60, 62 for exposing predetermined areas of the lead frame 32. Accommodated in the depression 62 is a small-size variable resistor or the like, connected to the mounted electronic circuit, for minutely adjusting the driving current to the light-emitting device 48. The depression 60 is provided for measuring the potential of a predetermined pattern on the lead frame with a probe pin upon the minute adjustment.

Figure 5:
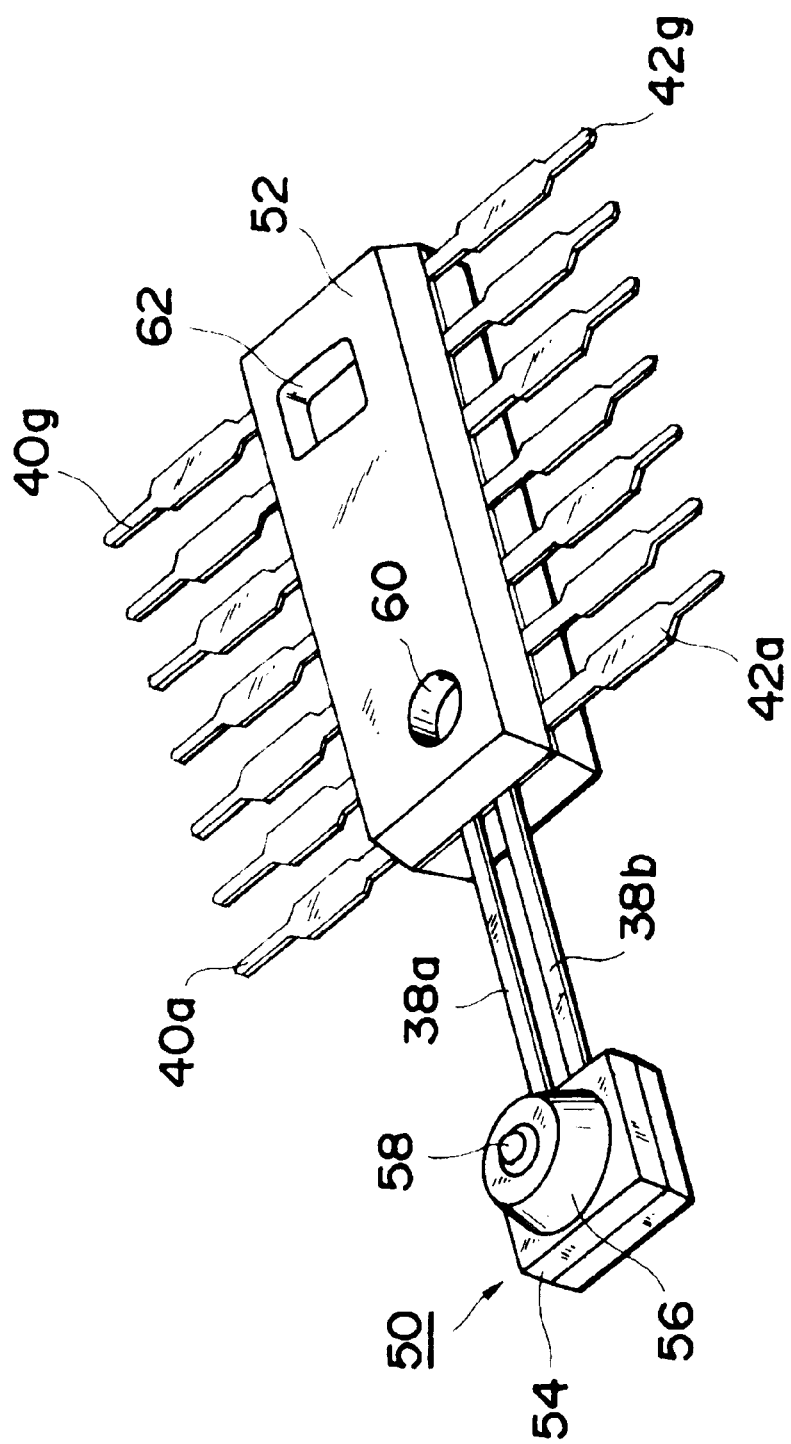
FIG. 5 is a perspective view showing the appearance of the intermediate component of the light-emitting module.

After the head portion 50 and the body portion 52 are thus molded, the variable resistor or the like is mounted in the depression 62 and is electrically connected to the electronic circuit. Then, unnecessary portions of the lead frame 32 are removed, whereby an intermediate component such as that shown in FIG. 5 is obtained. Further, the inner lead pins 38a, 38b (neck portion) and the outer lead pins 40a to 40g, 42a to 42g are bent, thus yielding a DIP (dual inline package) type light-emitting module 64 as shown in FIGS. 6A and 6B.

Figure 6A:
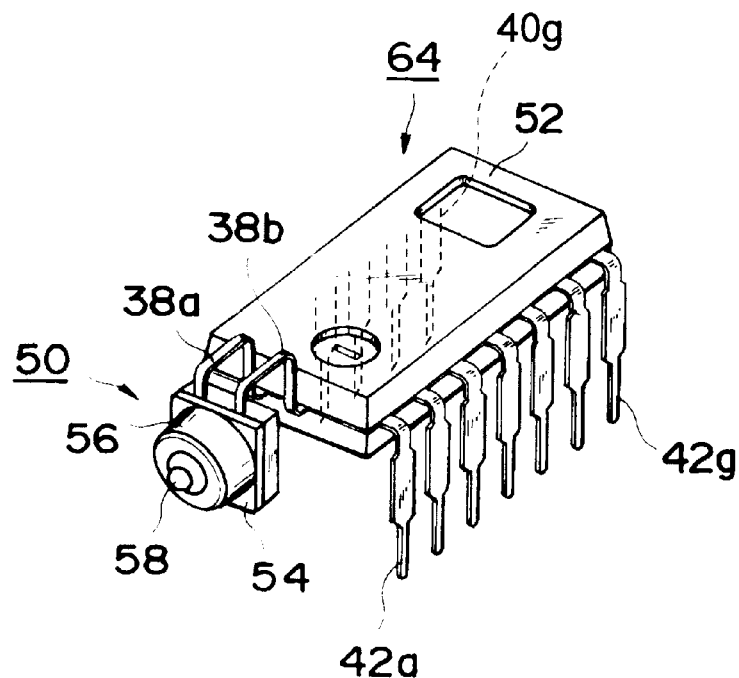
Figure 6B:
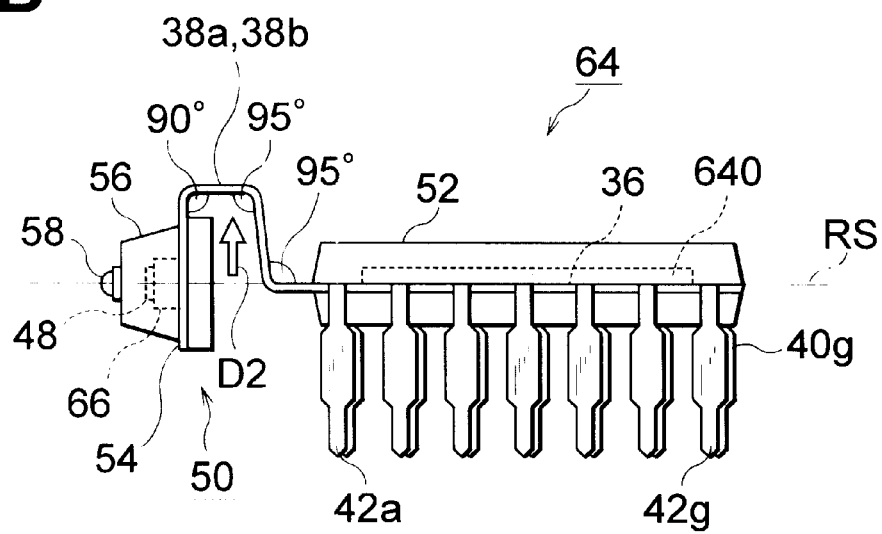
FIG. 6B is a side view of the light-emitting module shown in FIG. 6A.

FIG. 6A is a perspective view of thus completed light-emitting module 64 as observed from obliquely in front of the head portion 50, whereas FIG. 6B is a side view of the light-emitting module 64.

Here, as shown in FIG. 6B, the respective parts of the inner lead pins 38a, 38b in close proximity to the body portion 52 are bent upward at an angle of about 95°. Substantially the center parts thereof are bent to the opposite side (outward) at an angle of about 95°. Their parts in close proximity to the head portion 50 are bent upward at an angle of about 90°. Consequently, each of the inner lead pins 38a, 38b has a form projecting in the direction indicated by the arrow D2 perpendicular to the reference surface RS. Here, the direction indicated by the arrow D2 is opposite to that indicated by the arrow D1 in FIG. 3B. On the other hand, the outer lead pins 40a to 40g, 42a to 42g are bent such as to extend in a direction (opposite to the direction indicated by the arrow D2) orthogonal to the mounting surface of the electronic device mounting portion 36 on the side not mounted with an electronic device 640.

When the light-receiving module 64 having thus bent inner lead pins 38a, 38b and outer lead pins 40a to 40g, 42a to 42g is attached to the alignment substrate 80, which will be explained later, via the outer lead pins 40a to 40g, 42a to 42g, the electronic device mounted to the electronic device mounting portion 36 would be positioned on the upper side of the lead frame. Also, the intermediate portions of the inner lead pins 38a, 38b become substantially in parallel to the reference surface RS.

The light-emitting module 64 is actuated when electric power is supplied to a predetermined lead pin among the outer lead pins 40a to 40g, 42a to 42g. When an electric signal is fed to another outer lead pin, this signal is supplied, with its power amplified by the electronic circuit mounted in the body portion 52, to the electricity-to-light conversion device 48 in the head portion 50 via the inner lead pins 38a, 38b. As a consequence, an optical signal corresponding to the electric signal is transmitted to the optical fiber transmission line.

In the light-emitting module 64, as with the light-receiving module 30, the head portion 50 and the body portion 52 are molded as being separated from each other. In addition, since the head portion 50 and the body portion 52 are connected together via the inner lead pins 38a, 38b favorable optical accuracy, excellent adaptability to various kinds of communications devices, and low cost can be obtained.

With reference to FIGS. 7A, 7B, 8, and 9, the configuration of an optical data link comprising the above-mentioned light-receiving module 30 and light-emitting module 64 will now be explained together with its manufacturing process.

Figure 7A:
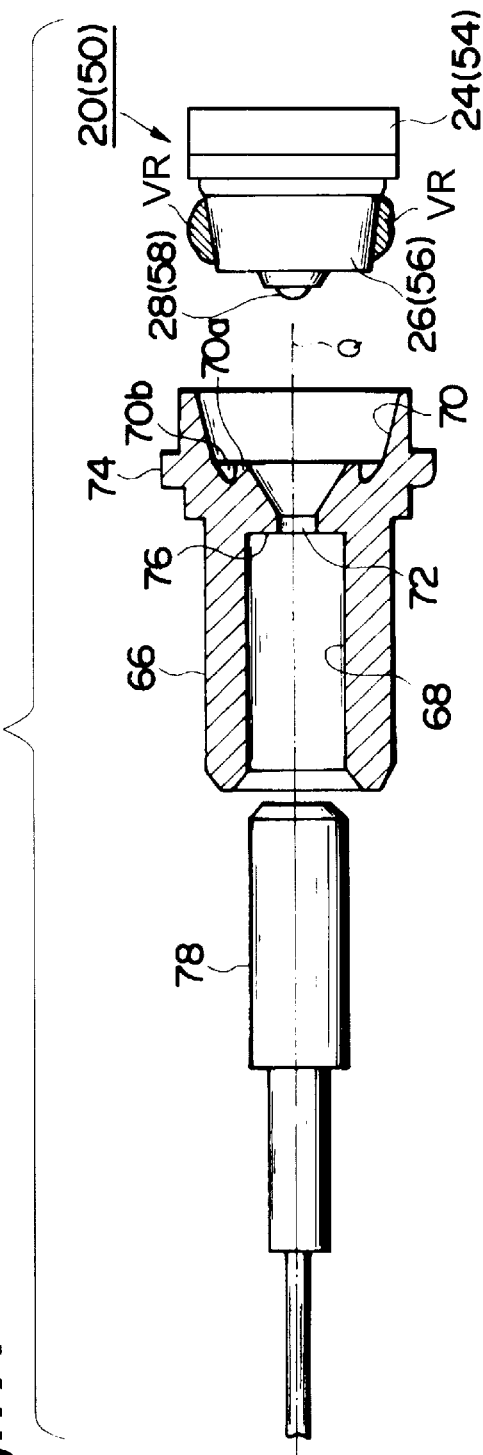
Figure 7B:
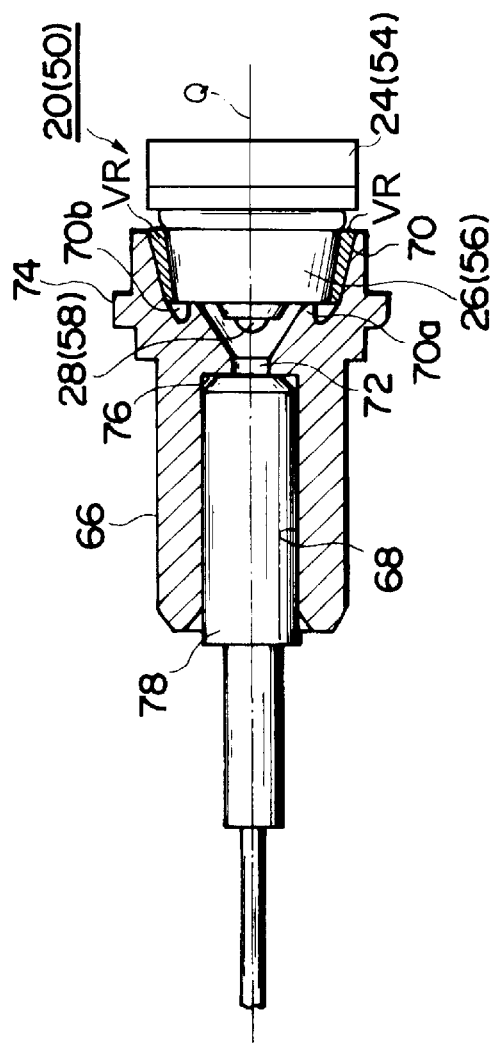
FIG. 7B is a sectional view showing a joint structure obtained through the assembling step shown in FIG. 7A.

In FIGS. 7A and 7B, a sleeve 66 for mounting a ferrule receiving an optical fiber is fixedly attached to each of the respective head portions 20, 50 of the light-receiving module 30 and light-emitting module 64 with a UV-curable resin.

The sleeve 66 is a member molded with an opaque resin such as to yield an annular tube form. The sleeve 66 has an alignment hole 68 for inserting the ferrule from the front end side, an alignment hole 70 for mounting the pedestal part 26, 56 from the rear end side, and a via hole 72 for communicating these alignment holes 68, 70 to each other. At a predetermined position, the outer peripheral portion of the sleeve 66 is formed with a flange 74. The inner peripheries of the holes 68, 70, 72 have been designed beforehand such that, when a ferrule 78 receiving a multi-mode optical fiber is inserted into the hole 68, the optical axis Q of the multi-mode optical fiber is located at the center thereof. The hole 70 has an inner peripheral face shaped like a circular truncated cone in conformity to the taper surface of the pedestal part 26, 56, an annular protrusion 70a, and a resin reservoir 70b shaped like an annular depression. Further, the hole 68 having a larger diameter and the via hole 72 having a diameter smaller than the former form a step 76 at the boundary thereof, to which the front end of the ferrule 78 abuts.

Each of the pedestal part 26 of the light-receiving module 30 and the pedestal part 56 of the light-emitting module 64 is fitted into the hole 70 in the state where their taper surface is coated with an UV-curable resin VR. As the UV-curable resin VR is irradiated with UV rays, the sleeve 66 is fixedly attached to each head portion 20, 50. Further, in this attaching process, the optical axis alignment and axis-to-axis distance adjustment between the multi-mode optical fiber and each optical device 18, 48 are simultaneously effected according to so-called power monitor method in which the optical module 30, 64 is actually operated in the state where an adjustment ferrule 78 receiving the multi-mode optical fiber is inserted in the hole 68.

Here, when inserting the pedestal part 26, 56 into the alignment hole 70, the annular protrusion 70a and the resin reservoir 70b restrain the UV-curable resin VR from adhering to the aspherical lens 28, 58. In this embodiment, for responding to the change in form of the aspherical lens 28, 58 caused by fluctuations in constriction of the head portion 20, 50, three-axis centering is effected. Further, after the sleeve 66 is once fixedly attached, it is reinforced with a thermosetting resin, whereby an optimal centering state is maintained as it is. Therefore, the shifting of optical axis and the like would not occur during a later manufacturing step and so forth, whereby an optical coupling structure having a very high accuracy is realized free of maintenance.

Figure 8:
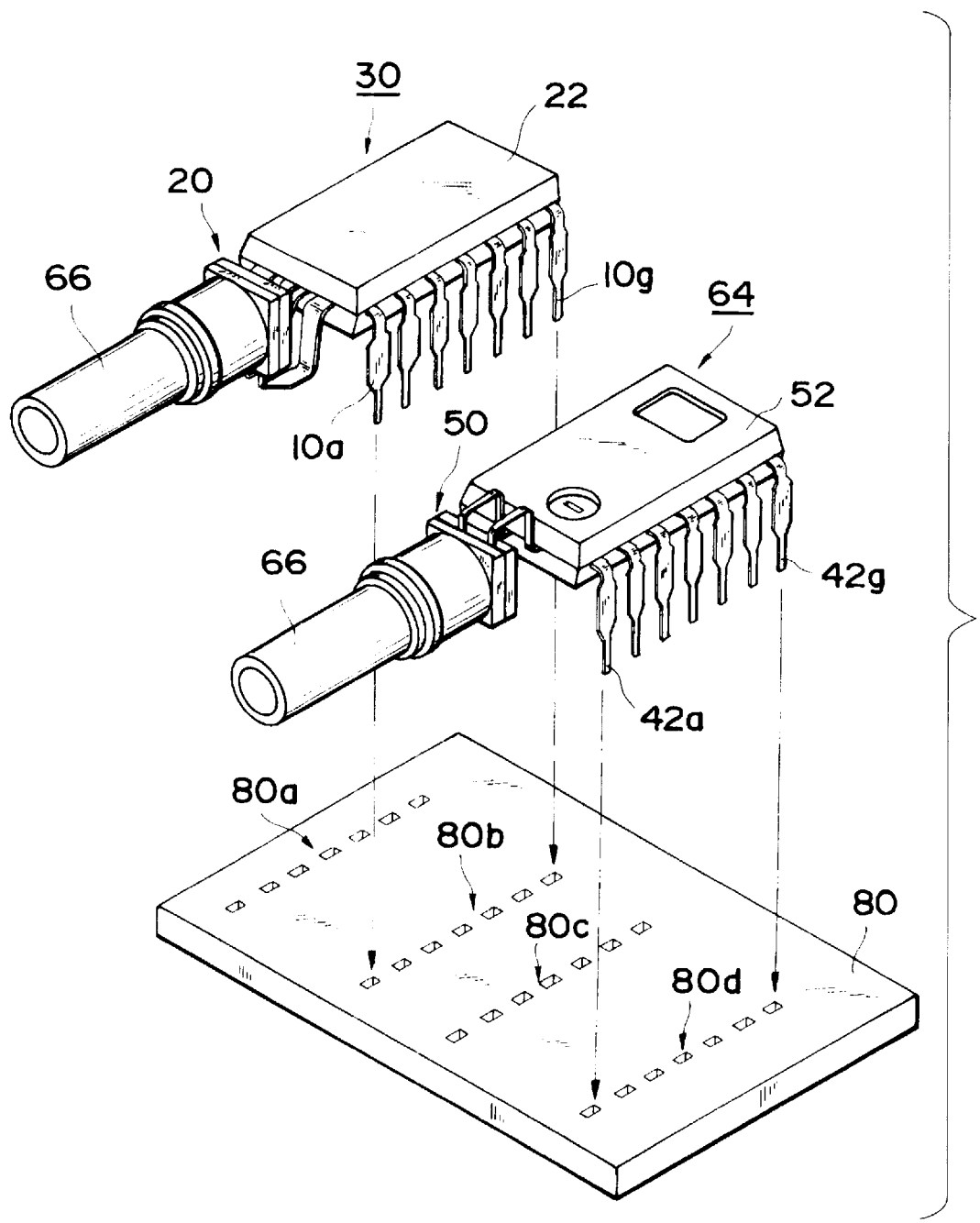
FIG. 8 is a perspective view for explaining the configuration of major parts of the optical data link according to the first embodiment.
Figure 9:
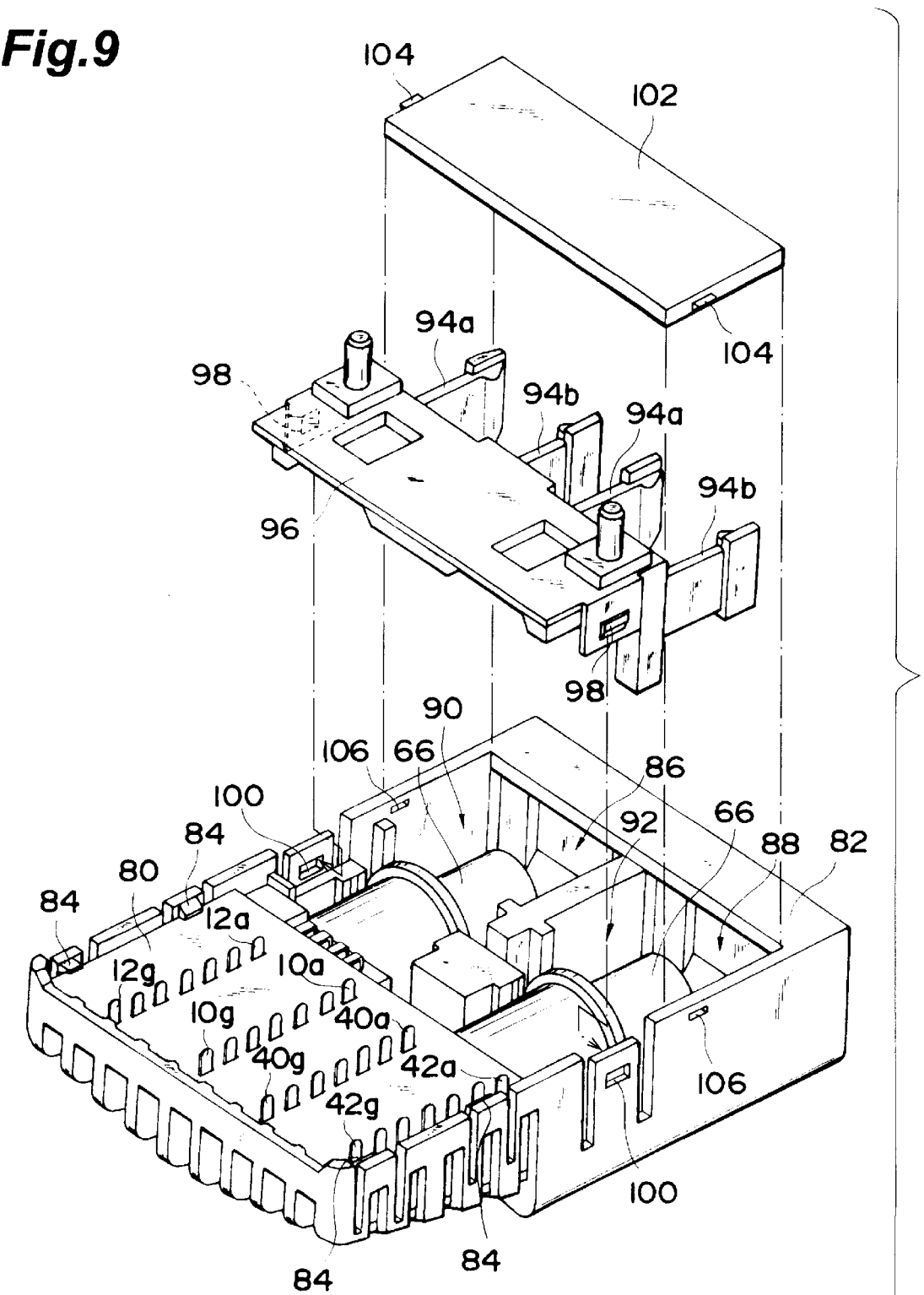
FIG. 9 is a perspective view for explaining the configuration of the optical data link according to the present invention.

Now, referring to FIG. 8, as the outer lead pins 10a to 10g, 12a to 12g of the light-receiving module 30 and the outer lead pins 40a to 40g, 42a to 42g of the light-emitting module 64 are inserted into a plurality of columns of through hole groups 80a to 80d disposed at predetermined positions of the rectangular alignment substrate 80 molded with a glass epoxy resin or the like, these lead pins are integrated with the substrate 80. Further, as shown in FIG. 9, the alignment substrate 80 is assembled in a shell-shaped housing 82 molded with an opaque resin such that the light-receiving module 30 and the light-emitting module 64 are accommodated in the housing 82.

Here, the housing 82 is provided with a plurality of engagement protrusions 84 projecting inward, and a plurality of steps adapted to cooperate with the engagement protrusions 84 to support the alignment substrate 80. As a side end portion of the alignment substrate 80 is fitted between the engagement protrusions 84 and the steps, the light-receiving module 30 and the light-emitting module 64 are automatically accommodated at a rear position within the housing 82. Also, as a consequence of this configuration, the alignment substrate is integrated with the housing 82.

The housing 82 is further provided with openings 86, 88, formed at front positions, for inserting ferrules, and sleeve mounting spaces 90, 92 extending backward from the openings 86, 88. As the alignment substrate 80 is simply assembled in the housing 82, the individual sleeves 66 are automatically mounted in the sleeve mounting spaces 90, 92 toward the openings 86, 88, respectively.

Then, a resin-molded engagement member 96 having two pairs of holder strips 94a, 94b adapted to hold the respective sleeves 66 therebetween is attached to the housing 82 continuously with the alignment substrate 80 so as to cover the sleeve mounting spaces 90, 92, whereby the holder strips 94a, 94b support the respective sleeves 66 at predetermined positions within the housing 82. Here, a pair of engagement protrusions 98, 98 projecting from both side ends of the engagement member 96 are fitted into a pair of engagement holes 100, 100 formed at side walls of the housing 82. As a consequence, the engagement member 96 is automatically attached to the housing 82.

Further, a rectangular bottom plate 102 is attached to the housing 82 so as to cover the sleeves 66 supported by the holder strips 94a, 94b. As a consequence, the optical data link according to the first embodiment is accomplished. Here, as a pair of engagement protrusions 104, 104 projecting from both side ends of the rectangular flat sheet 102 are simply fitted into a pair of engagement holes 106, 106 formed at the side walls of the housing 82, the rectangular flat sheet 102 is automatically attached to the housing 82. The alignment substrate 80, engagement member 96, and rectangular flat sheet 102 function as a bottom sheet for covering the rear side of the housing 82.

Thus, since the optical data link according to the first embodiment employs the DIP type light-receiving module 30 and light-emitting module 64 separated from each other, the optical axis adjustment and axis-to-axis distance adjustment in each of the light-receiving system and light-emitting system can be effected independently of each other. Since the sleeves 66 that have already been subjected to the optical axis adjustment and axis-to-axis distance adjustment are fixedly attached to the respective optical modules 30, 64, the assembling process can greatly be simplified. Further, since the adjustment of the distance (layout spacing) between the optical modules 30, 64 and the attachment adjustment of each sleeve 66 can be performed separately and independently from each other, the accuracy in centering between the optical modules 30, 64 and their corresponding sleeves 66 would not be influenced by the adjustment of the layout spacing. As a consequence, an optical module having an optically very high accuracy can be realized.

Further, in the optical data link according to this embodiment, the respective inner lead pins of the light-receiving module 30 and light-emitting module 64 are bent such as to project opposite to each other. As a consequence, when they are assembled in the housing 82 side by side such that their respective optical device mounting portions 4, 34 are oriented in the same direction, the projections of their corresponding inner lead pins would be distanced from each other. Since the projections of the respective inner lead pins are distanced from each other, even when electromagnetically induced noise is generated due to the switching current for driving the light-emitting device in the light-emitting module 64, it can be restrained from influencing the light-receiving module 30. Also, the influence of electromagnetically induced noise from the light-receiving module 30 upon the light-emitting module 64 can be suppressed. Further, even when the light-receiving module 30 and the light-emitting module 64 are disposed close to each other in the housing, influences of electromagnetically induced noise therebetween can be suppressed.

While the electronic device 300 is positioned under the electronic device mounting portion 6 with the outer lead pins 10a to 10g, 12a to 12g being bent downward in the light-receiving module 30 as shown in FIG. 3B, the electronic device 640 is positioned on the electronic device mounting portion 36 with the outer lead pins 40a to 40g, 42a to 42g being bent downward in the light-emitting module 64 as shown in FIG. 6B. Consequently, with reference to the mounting positions of the respective electronic devices 300, 640, the respective outer lead pins of the light-receiving module 30 and light-emitting module 64 are bent opposite to each other with respect to their corresponding electronic device mounting portions 6, 36.

Hence, when the optical modules 30, 64 are assembled in the housing 82 such that their respective outer lead pins are oriented in the same direction, their respective electronic devices 300, 640 would be positioned opposite to each other by way of their corresponding electronic device mounting portions 6, 36. As a result, a part of the lead frame which is set to a ground potential intervenes between the electronic devices of the respective optical modules 30, 60, thereby exhibiting a favorable shield effect.

Also, as the light-emitting optical module 64 and light-receiving module 30 independent of each other are assembled in the housing 82, the power lines and ground lines of their respective lead frames are electrically separated from each other, whereby influences of noise such as surge and ripple can be eliminated between the optical modules 30, 64.

Second Embodiment

In the following, with reference to FIGS. 10A to 11D, and 12, the second embodiment of the optical data link according to the present invention will be explained. The following explanation will mainly be focused on differences of the second embodiment from the first embodiment and characteristic features of the second embodiment.

Figure 10A:
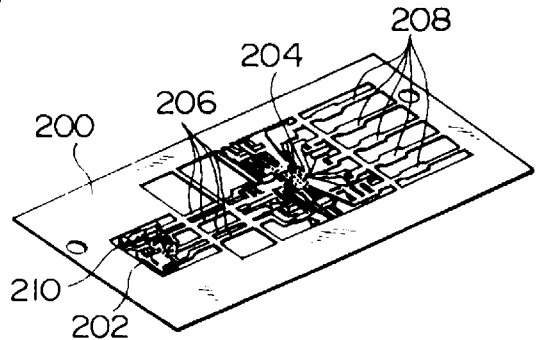
FIGS. 10A to 10D are views for sequentially explaining the manufacturing steps of the light-receiving module in a second embodiment of the optical data link according to the present invention.
Figure 10B:
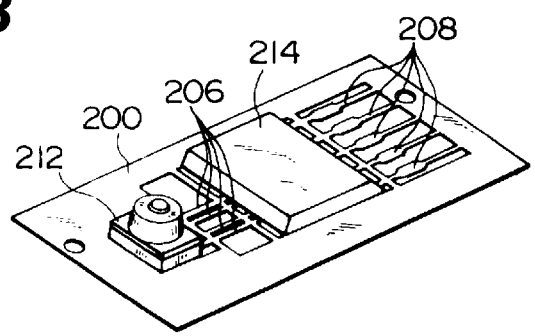
Figure 10C:
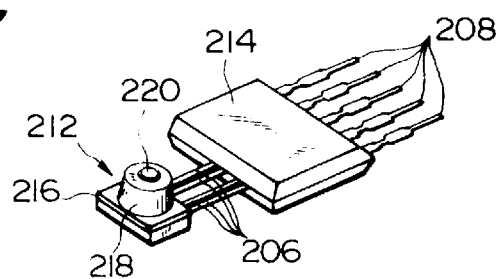

First, with reference to FIGS. 10A to 10D, the configuration of the light-receiving module will be explained together with its manufacturing process. Referring to FIG. 10A, a lead frame 200 for manufacturing the light-receiving module is formed with an optical device mounting portion 202 for mounting a light-receiving device (light-to-electricity conversion device), an electronic device mounting portion 204 for mounting an electronic circuit, four inner lead pins 206 for electrically and mechanically connecting these mounting portions 202, 204 to each other, and five outer lead pins 208 disposed on the backside of the electronic device mounting portion 204. The surfaces of the optical device mounting portion 202 and electronic device mounting portion 204 are plated with silver. A light-receiving device 210 is fixedly attached to the optical device-mounting portion 202 with the aid of a sub-mount member. On the other hand, an electronic device is fixedly attached to the electronic device-mounting portion 204, whereby an electronic circuit is mounted.

Then, as shown in FIG. 10, with a resin transparent to an optical signal, the optical device mounting portion 202 and the light-receiving device 210 are integrally sealed, and the electronic device mounting portion 204 and the electronic circuit are integrally sealed, whereby a head portion 212 and a body portion 214 are molded. Further, as unnecessary portions of the lead frame 200 are cut off, an intermediate component such as that shown in FIG. 10C is obtained. Here, as with the head portion 20 shown in FIG. 2, the head portion 212 has such a configuration that a base part 216 in which the light-receiving device (light-to-electricity conversion device) 210 is buried, a pedestal part 218 shaped like a circular truncated cone, and an aspherical lens 220 are integrally molded.

Figure 10D:
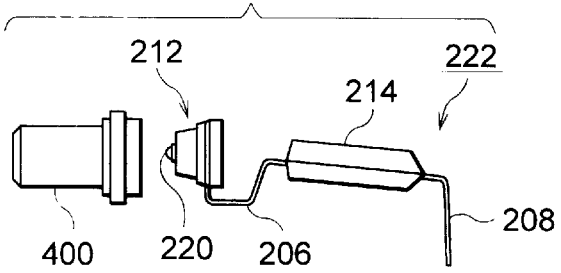

Subsequently, as shown in FIG. 10D, the inner lead pins 206 and outer lead pins 208 are bent, thereby accomplishing a SIP (single inline package) type light-receiving module 222 in which the outer lead pins 208 align in a single line.

Here, as in the case of the light-receiving module shown in FIG. 3B, the inner lead pins 206 are bent such as to project downward. The outer lead pins 208 are bent such as to extend substantially orthogonal to the electronic device mounting portion 204 on the side mounted with the electronic device. Namely, the electronic device mounted to the electronic device-mounting portion 204 is located on the lower side of the lead frame.

Figure 11A:
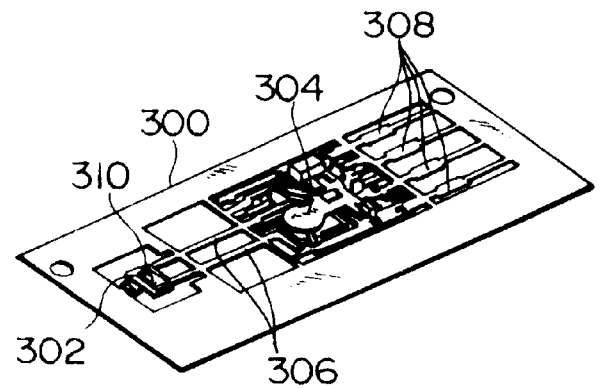
FIGS. 11A to 11D are views for sequentially explaining the manufacturing steps of the light-emitting module in the second embodiment of the optical data link according to the present invention.

With reference to FIGS. 11A to 11D, the configuration of the light-emitting module will now be explained together with its manufacturing process. Referring to FIG. 11A, a lead frame 300 for manufacturing the light-emitting module is formed with an optical device mounting portion 302 for mounting a light-emitting device (electricity-to-light conversion device), an electronic device mounting portion 304 for mounting an electronic circuit, two inner lead pins 306 for electrically and mechanically connecting these mounting portions 302, 304 to each other, and four outer lead pins 308 disposed on the backside of the electronic device mounting portion 304. The surfaces of the optical device mounting portion 302 and electronic device mounting portion 304 are plated with silver. A light-emitting device 310 is fixedly attached to the optical device-mounting portion 302. On the other hand, an electronic device is fixedly attached to the electronic device-mounting portion 304, whereby an electronic circuit is mounted.

Figure 11B:
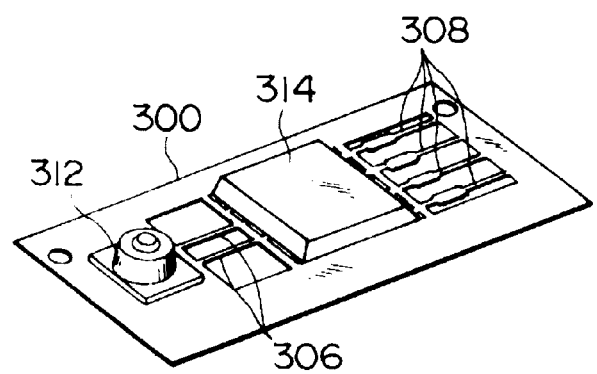
Figure 11C:
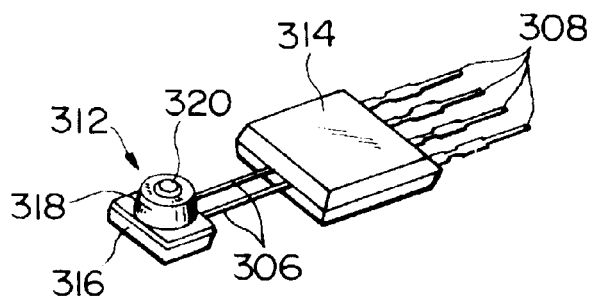

Then, as shown in FIG. 11B, with a resin transparent to the optical signal, the optical device mounting portion 302 and the light-emitting device 310 are integrally sealed, and the electronic device mounting portion 304 and the electronic circuit are integrally sealed, whereby a head portion 312 and a body portion 314 are molded. Further, as unnecessary portions of the lead frame 300 are cut off, an intermediate component such as that shown in FIG. 11C is obtained. Here, as with the head portions 20, 212 shown in FIGS. 2 and 10C, the head portion 312 has such a configuration that a base part 316 in which the light-emitting device 310 is buried, a pedestal part 318 shaped like a circular truncated cone, and an aspherical lens 320 are integrally molded.

Figure 11D:
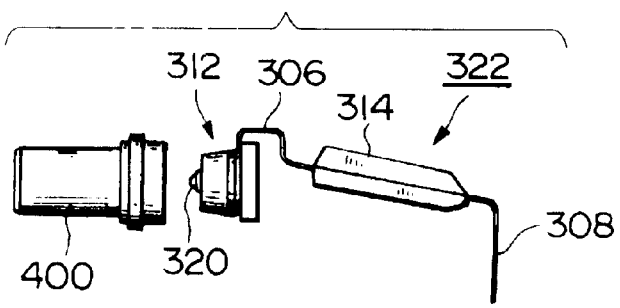

Subsequently, as shown in FIG. 11D, the inner lead pins 306 and outer lead pins 308 are bent, thereby accomplishing a SIP (single inline package) type light-emitting module 322 in which the outer lead pins 308 align in a single line.

Here, as in the case of the light-emitting module shown in FIG. 6B, the inner lead pins 306 are bent such as to project upward. The outer lead pins 308 are bent such as to extend substantially orthogonal to the electronic device mounting portion 304 on the side not mounted with the electronic device. Namely, the electronic device mounted to the electronic device-mounting portion 304 is located on the upper side of the lead frame.

The configuration of the optical data link using the light-receiving module 222 and light-emitting 322 according to the second embodiment will now be explained together with its manufacturing process.

First, as shown in FIGS. 10D and 11D, a sleeve 400 for mounting a ferrule receiving an optical fiber is fixedly attached to each of the respective head portions 212, 312 of the optical modules 222, 322. Namely, the sleeve 400 is a resin-molded member shaped like an annular tube, as with the one shown in FIGS. 7A and 7B, and is fixedly attached to each head portion 212, 312 with an UV-curable resin and a thermosetting resin.

Figure 12:
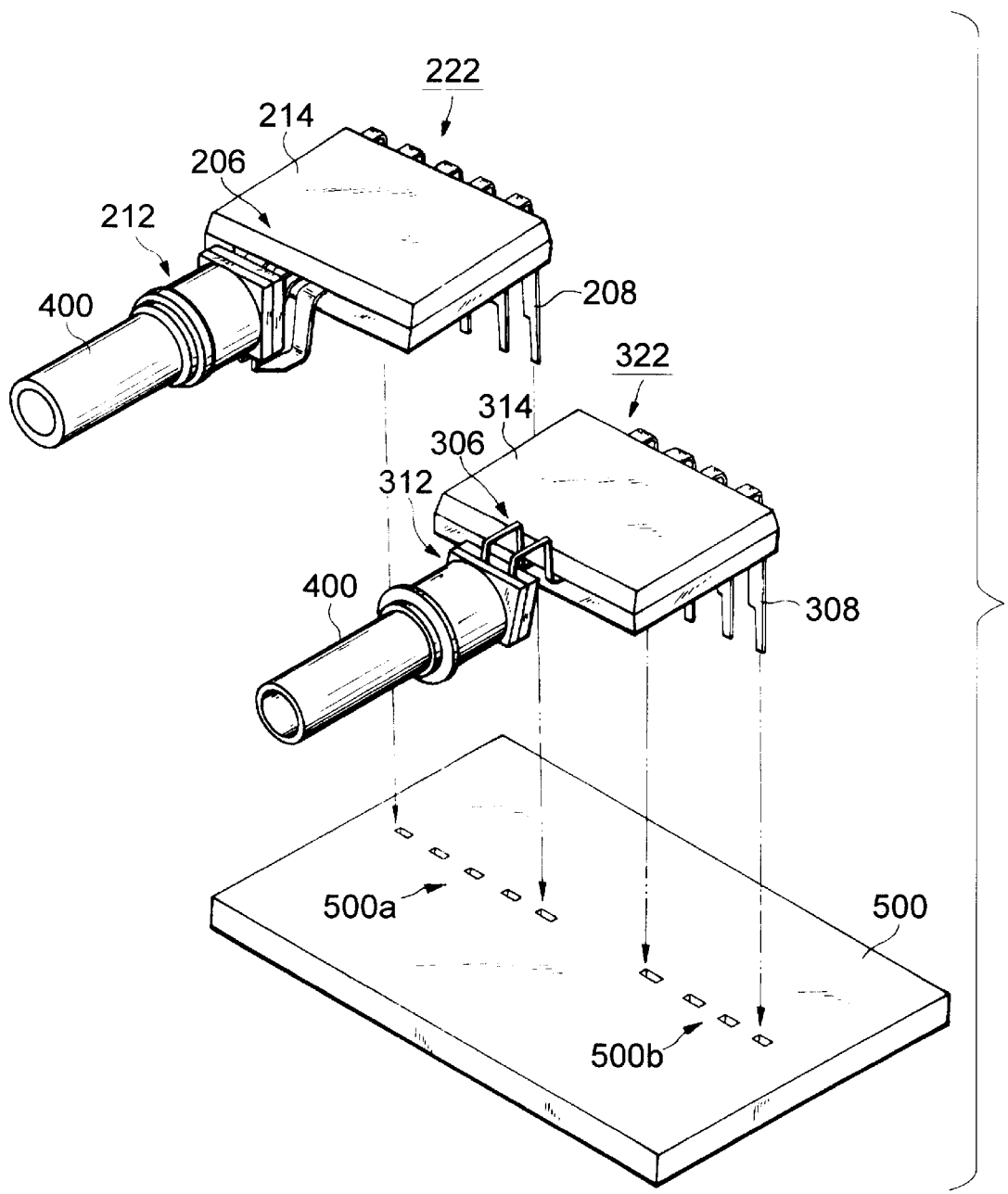
FIG. 12 is a perspective view for explaining the configuration of major parts of the optical data link according to the second embodiment.

Now, referring to FIG. 12, as the outer lead pins 208 of the light-receiving module 222 and the outer lead pins 308 of the light-emitting module 322 are inserted into through hole groups 500a and 500b disposed column by column at predetermined positions of a rectangular alignment substrate 500, these lead pins are integrated with the substrate 500. Further, as shown in FIG. 9, the alignment substrate 500 is assembled in the resin-molded housing 82 such that the light-receiving module 222 and the light-emitting module 322 are accommodated in the housing 82. Further, the engagement member 96 and the rectangular flat sheet 102 are attached to the housing 82, thereby accomplishing the optical data link according to this embodiment.

Thus, the optical module 222, 322 in accordance with the second embodiment has an integrated structure in which the head portion 212, 312 and the body portion 214, 314 are separated from each other, while the head portion 212, 312 and the body portion 214, 314 are connected to each other via the inner lead pins 206, 306, thereby yielding such eminent effects as excellent mechanical strength, favorable optical accuracy, excellent adaptability to various kinds of communications devices, and low cost.

Also, since the optical data link according to the second embodiment is constituted by the SIP type light-receiving module 222 and light-emitting module 322 separated from each other, the optical axis adjustment and axis-to-axis distance adjustment in each of the light-receiving system and light-emitting system can be effected independently of each other. Since the sleeves 400 that have already been subjected to the optical axis adjustment and axis-to-axis distance adjustment are fixedly attached to the respective optical modules 222, 322, the assembling process can greatly be simplified. Further, since the adjustment of the distance (layout spacing) between the optical modules 222, 322 and the attachment adjustment of each sleeve 400 can be performed separately and independently from each other, the accuracy in centering between the optical modules 222, 322 and their corresponding sleeves 400 would not be influenced by the adjustment of the layout spacing. As a consequence, an optical module having an optically very high accuracy can be realized.

Further, in the optical data link according to the second embodiment, the respective inner lead pins of the light-receiving module 222 and light-emitting module 322 are bent such as to project opposite to each other. As a consequence, even when the light-receiving module 222 and light-emitting module 322 are disposed close to each other in the housing 82, the projections of their corresponding inner lead pins would be distanced from each other, whereby influences of electromagnetically induced noise between the optical modules 222, 322 can be suppressed.

Also, since the respective outer lead pins of the light-receiving module 222 and light-emitting module 322 are bent opposite to each other with respect to their corresponding electronic device mounting portions 204, 304, a part of the lead frame which is set to a ground potential intervenes between the electronic devices of the respective optical modules 222, 322, thereby exhibiting a shield effect.

Further, as the light-emitting optical module 222 and light-receiving module 322 independent of each other are assembled in the housing 82, the power lines and ground lines of their respective lead frames are electrically separated from each other, whereby influences of noise such as surge and ripple can be eliminated between the optical modules 222, 322.

Though the above-mentioned first and second embodiments relate to the cases where, as shown in FIGS. 8 and 12, the inner lead pins 8a to 8d, 206 of the light-receiving modules 30, 222 are bent such as to project downward, and the inner lead pins 38a, 38b, 306 of the light-emitting optical modules 64, 322 are bent such as to project upward; the inner lead pins 8a to 8d, 206 of the light-receiving modules 30, 222 may be bent such as to project upward, and the inner lead pins 38a, 38b, 306 of the light-emitting optical modules 64, 322 may be bent such as to project downward. The projections of the inner lead pins 8a to 8d, 206 and the projections of the inner lead pins 38a, 38b, 306 would be distanced from each other in the housing 82 in the latter case as well, whereby influences of electromagnetically induced noise between the light-receiving module 30, 222 and light-emitting module 64, 322 can be suppressed even when they are disposed close to each other in the housing 82.

As explained in the foregoing, since optical condensing means is integrated with the head portion, the optical data link according to the present invention can reduce the number of parts. Also, the optical axis adjustment and axis-to-axis distance adjustment between the optical devices and optical condensing means can be made unnecessary. Further, there is no need for such a structure as to connect the optical condensing means to the optical devices with a metal connector or the like, whereby the cost of the optical data link can be cut down.

Further, each optical module is molded such that the head portion in which the optical device is sealed with a resin and the body portion in which the electronic device is sealed with a resin are separated and independent from each other, while being electrically and mechanically connected to each other via inner lead pins. As a consequence, the optical axis adjustment or axis-to-axis adjustment with respect to an optical fiber in the communications device can easily be realized.

In respective optical modules, since the optical device mounting portion and the electronic device mounting portion are separated from each other, the degree of freedom in designing electronic circuits is enhanced. Thereby, a complicated, large-scale electronic circuit adapted to correspond to the demand for higher-grade optical communications can be mounted. Also, even when the body portion is made larger as the scale of the electronic circuit enhances, the head portion would not be influenced thereby, whereby the optical axis adjustment and axis-to-axis adjustment can easily be effected.

Moreover, since this optical module has no movable part, it has an excellent structure in that mechanical strength is high, its optical accuracy is always held in an optimal state, and so forth.

In addition, since the respective inner lead pins of the light-receiving module and light-emitting module are bent such as to project opposite to each other, the projections of their corresponding inner lead pins would be distanced from each other when assembled in the housing, whereby influences of electromagnetically induced noise between these optical modules can be suppressed.

Also, since the respective outer lead pins of the light-receiving module and light-emitting module are bent opposite to each other with respect to their corresponding electronic device mounting portions, so that a part of the lead frame which is set to a ground potential intervenes between the electronic devices of the respective optical modules when assembled in the housing, a further shield effect can be obtained.

Further, as the light-emitting optical module and light-receiving module are assembled independently in the housing, the power lines and ground lines of their respective lead frames are electrically separated, whereby influences of noise such as surge and ripple can be eliminated between the optical modules.

Thus, as the influence of electromagnetically induced noise is suppressed between the transmitting and receiving systems accommodated in a single housing, an optical data link enabling high grade transmission and reception can be obtained.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical data link for connecting an optical fiber transmission line and an electric signal transmission line to each other, said optical data link comprising:

a housing;

light-receiving and light-emitting modules each having at least a part accommodated in said housing, each of said light-receiving and light-emitting modules having:

a head portion being provided such that an optical component including one of light-receiving and light-emitting devices and a first support portion on which said optical component is mounted are integrally resin-molded;

a body portion being provided such that an electronic device and a second support portion on which said electronic device is mounted are integrally resin-molded; and a neck portion coupling said first support portion to said second support portion and supporting said head portion at a predetermined position with respect to said body portion, while said optical component and said electronic device are electronically connected to each other; and an insulating substrate having a main surface on which said light-receiving and light-emitting modules are mounted, while a predetermined distance separates said modules from each other.

2. An optical data link according to claim 1, wherein each of said light-receiving and light-emitting devices includes a lead frame, said lead frame comprising:

a first part, corresponding to said second support portion, having a mounting surface for said electronic device;

a second part, corresponding to said neck portion, extending from a periphery of said first part and having a surface that continuous from said mounting surface; and a third part, corresponding to said first support portion, positioned at a tip of said second part and having a surface that continuous from said mounting surface of said first part via said second part.

3. An optical data link according to claim 2, wherein said lead frame comprises one of a DIP type outer lead pin for external connection and a SIP type outer lead pin for external connection.

4. An optical data link according to claim 1, further comprising a sleeve for aligning a tip portion of an optical fiber included in said optical fiber transmission line at a predetermined position, while said tip portion is accommodated therein, and for maintaining an optically coupled state of said optical component and optical fiber, while at least a part of said head portion is accommodated therein.

5. An optical data link according to claim 1, wherein an optical fiber in said optical fiber transmission line includes a multi-mode optical fiber.

6. An optical data link according to claim 1, wherein said head portion includes a sub-mount member provided between said optical component and said first support portion, said optical component being mounted to said first support portion with said sub-mount member interposed therebetween.

7. An optical data link according to claim 1, wherein said light-emitting device includes at least one of a surface emission type light-emitting diode and a surface emission type semiconductor laser.

8. An optical data link according to claim 1, wherein said light-receiving device includes a front illumination type InGaAs photodiode.

9. An optical data link for connecting an optical fiber transmission line and an electric signal transmission line to each other, said optical data link comprising:
   a housing; and
   light-receiving and light-emitting modules each having at least a part accommodated in said housing in a state arranged on a predetermined reference surface, each of said light-receiving and light-emitting modules having:
      a head portion being provided such that an optical component including one of light-receiving and light-emitting devices and a first support portion on which said optical component is mounted are integrally resin-molded;
      a body portion being provided such that an electronic device and a second support portion on which said electronic device is mounted are integrally resin-molded; and
      a neck portion coupling said first support portion and said second support portion and supporting said head portion at a predetermined position with respect to said body portion, while said optical component and said electronic device are electronically connected to each other;
   wherein said neck portion of said light-receiving module is bent so as to project along a first direction orthogonal to said reference surface, and said neck portion of said light-emitting module is bent so as to project along a second direction opposite to said first direction.

10. An optical data link according to claim 9, wherein each of said light-receiving and light-emitting devices includes a lead frame, said lead frame comprising:
   a first part, corresponding to said second support portion, having a mounting surface for said electronic device;
   a second part, corresponding to said neck portion, extending from a periphery of said first part and having a surface that continuous from said mounting surface; and
   a third part, corresponding to said first support portion, positioned at a tip of said second part and having a surface that continuous from said mounting surface of said first part via said second part.

11. An optical data link according to claim 10, wherein said lead frame comprises one of a DIP type outer lead pin for external connection and a SIP type outer lead pin for external connection.

12. An optical data link according to claim 9, further comprising a sleeve for aligning a tip portion of an optical fiber included in said optical fiber transmission line at a predetermined position, while said tip portion is accommodated therein, and for maintaining an optically coupled state of said head portion and optical fiber, while at least a part of said optical component is accommodated therein.

13. An optical data link according to claim 9, wherein an optical fiber in said optical fiber transmission line includes a multi-mode optical fiber.

14. An optical data link according to claim 9, wherein said head portion includes a sub-mount member provided between said optical component and said first support portion, said optical component being mounted to said first support portion with said sub-mount member interposed therebetween.

15. An optical data link according to claim 9, wherein said light-emitting device includes at least one of a surface emission type light-emitting diode and a surface emission type semiconductor laser.

16. An optical data link according to claim 9, wherein said light-receiving device includes a front illumination type InGaAs photodiode.

* * * * *